United States Patent [19]

White

[11] Patent Number: 4,511,468

[45] Date of Patent: Apr. 16, 1985

[54] ROTARY VACUUM PRE-COAT FILTER APPARATUS

[75] Inventor: Harold R. White, New Lenox, Ill.

[73] Assignee: Alar Engineering Corporation, Mokena, Ill.

[21] Appl. No.: 559,273

[22] Filed: Dec. 8, 1983

Related U.S. Application Data

[63] Continuation-in-part of Ser. No. 296,135, Aug. 25, 1981.

[51] Int. Cl.$^3$ .............................................. B01D 33/06
[52] U.S. Cl. .................................. 210/181; 210/193; 210/251; 210/402
[58] Field of Search ............... 210/769, 784, 777, 778, 210/193, 251, 396, 402, 404, 181, 184

[56] References Cited

U.S. PATENT DOCUMENTS

| | | | |
|---|---|---|---|
| 3,635,341 | 1/1972 | Davis | 210/396 X |
| 3,780,861 | 12/1973 | Hirs | 210/80 |
| 3,870,632 | 3/1975 | Erskine | 210/769 X |
| 3,900,395 | 8/1975 | Hirs | 210/80 |
| 4,197,205 | 4/1980 | Hirs | 210/275 |
| 4,238,334 | 12/1980 | Halbfoster | 210/777 X |
| 4,315,824 | 2/1982 | Karolkiewicz et al. | 210/769 |

OTHER PUBLICATIONS

Johns-Manville, "Celite Filter Aids", Brochure FA-8-4A-RWC.
Eagle-Picher Celatom, "Diatomic Filter Aids", Brochure A-500.
Grefco, Inc., "Diacalite Perlite Filter Aid", Technical Bulletin P-11-E.
Eagle Picher "Pre-co-Floc", Cellulose fiber filter aids provide superior performance, Bulletin, Form C-100.
Johns-Manville, "Celite", Technical Data sheet FF-238A.

*Primary Examiner*—Thomas Wyse
*Attorney, Agent, or Firm*—Hill, Van Santen, Steadman & Simpson

[57] ABSTRACT

This invention relates to the art of vacuum pre-coat filtering to produce solids capable of being incinerated for their heat value and recovery of non-combustible solids. Specifically, the invention deals with rotary vacuum filtering apparatus containing a coating layer on the filter drum screen of a combustible non-fibrous particulate filter aid, preferably charcoal, which forms an efficient filter bed, is capable of being scraped from the bed in thin film form with the filtered out solids thereon and is capable of being incinerated eliminating heretofore necessary disposal expense.

9 Claims, 3 Drawing Figures

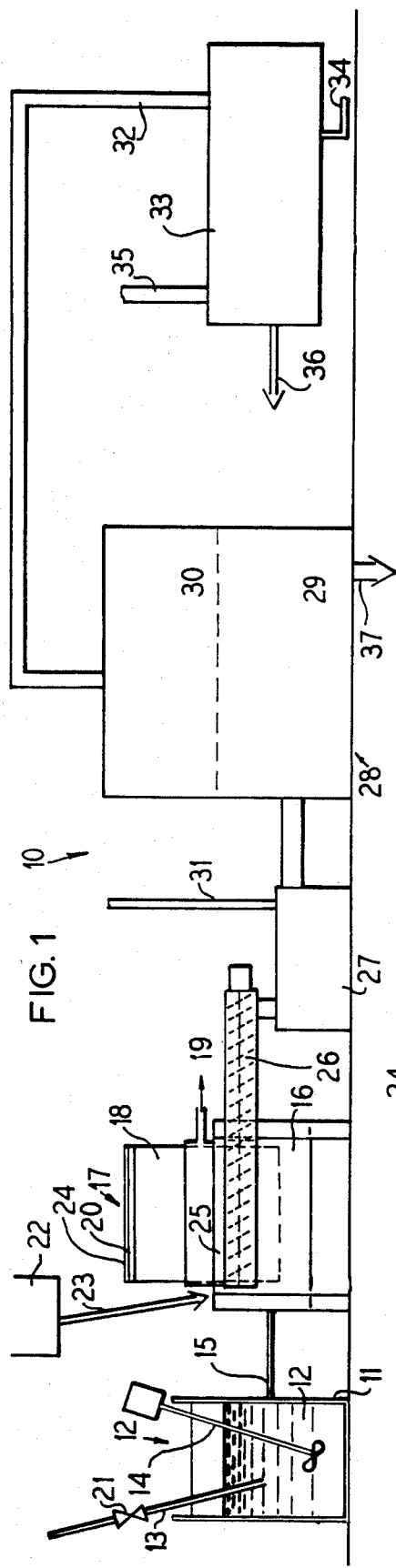
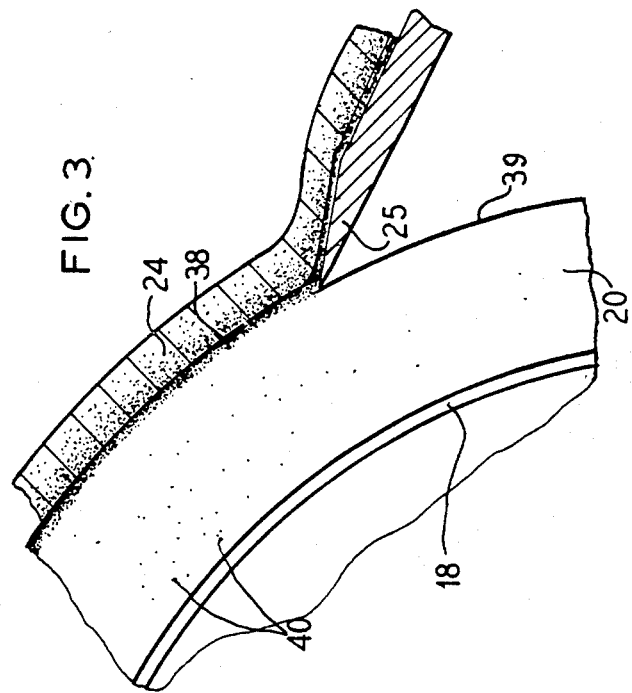
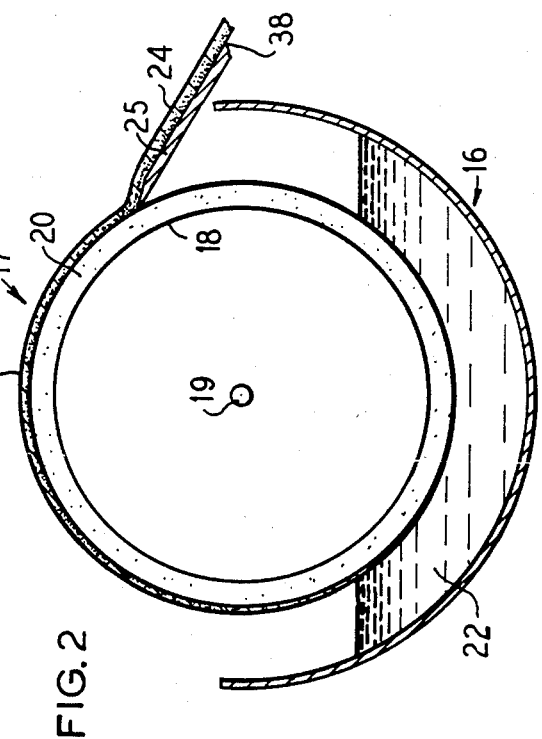
FIG. 1
FIG. 2
FIG. 3

ROTARY VACUUM PRE-COAT FILTER APPARATUS

RELATED APPLICATION

This application is a continuation-in-part of the Harold R. White application Ser. No. 296,135 filed Aug. 25, 1981 entitled "Filter Aid".

BACKGROUND OF THE INVENTION

1. Field of the Invention

This invention relates to the art of vacuum pre-coat filtering to produce solids capable of being incinerated for their heat value and recovery of non-combustible solids. Specifically, the invention deals with rotary vacuum filtering apparatus containing a coating layer on the filter drum screen of a combustible non-fibrous particulate filter aid, preferably charcoal, which forms an efficient filter bed, is capable of being scraped from the bed in thin film form with the filtered out solids thereon and is capable of being incinerated eliminating heretofore necessary disposal expense.

2. Description of the Prior Art

Heretofore known pre-coat filter aids have been of the non-combustible inorganic type such as diatomaceous earth, perlite, and the like or of the combustible type such as cellulose fibers. The incombustible filter aids prevent recovery of heat values in the filtered out solids because of their silicate origin which forms glass upon combustion of any combustible slurry solid admixed therewith and also prevents recovery of valuables in the solids. The combustible cellulose type filter aids are fibrous in nature and cannot be scraped evenly from the filter bed, thereby reducing their efficiency. The fibers are somewhat compressible and cannot form a dimensionally stable filter bed.

It would, therefore, be an improvement in the art to provide a filtering apparatus having a coating of efficient, combustible filter aid free from non-combustible ingredients and fibers and forming a dimensionally stable filter bed on the drum of a rotary vacuum filter machine.

SUMMARY OF THE INVENTION

According to this invention there is provided vacuum pre-coat filter units having a combustible non-fiber filter aid coating. The filter aid is in the form of non-fibrous combustible rigid particles of controlled particle size and density capable of forming a filter bed coating on the peripheral screen of the rotary vacuum filter drum which will maintain its dimensional integrity and have a desired porosity to pass only the liquid filtrate of a slurry while retaining the slurry solids thereon and having sufficient cohesion to maintain the filter bed and sufficient adhesion to retain the slurry solids on the penetrated film which is scraped from the bed. The scraped off filter aid and slurry solids can be incinerated to recover heat values and incombustible dry slurry material at the filtration location thereby avoiding costly disposal proceedings.

The initial filter bed on the drum screen can be from 2 to 6 inches thick. The film scraped off underlying the filtered solids will vary in thickness depending upon the depth of solids penetration but is usually less than $\frac{1}{4}$ inch. Thicknesses of 1/16 inch or less are generally used. The scraping can be continued until the remaining bed is just sufficient to retain the solids. End thicknesses of $\frac{1}{8}$ inch or so, depending upon the thickness of the cut, are useful. A single precoat is thus ample for many revolutions of the drum.

It is then an object of this invention to provide pre-coat rotary vacuum filter systems with non-fibrous combustible pre-coat filter beds.

Another object of the invention is to provide vacuum pre-coat filter units with beds of charcoal filter aid on the filter drum having density and particle sizes which will pass the liquid of a slurry while retaining the liquid slurry solids thereon, is capable of being scraped off of the filter bed in thin film form with the slurry solids thereon, is sufficiently rigid to maintain the structural dimensions of the filter bed on the filter drum and is capable of being incinerated with the solids of the slurry.

A specific object of the invention is to provide pre-coat rotary filter systems with filter aid beds of rigid granular non-fibrous combustible material having a bulk density of 0.3 to 0.6 grams per cubic centimeter, a particle density from about 1.4 to 1.5 grams per cubic centimeter, and a particle size of about 30 to 125 microns.

BRIEF DESCRIPTION OF THE DRAWINGS

FIG. 1 is a diagrammatic flow sheet illustrating a pre-coat filter system of this invention;

FIG. 2 is a somewhat diagrammatic transverse sectional view of a rotary drum filter with a pre-coat layer of combustible non-fibrous filter aid according to this invention;

FIG. 3 is an enlarged fragmentary view of the periphery of the filter drum illustrating the removal of the filtered solids and penetrated filter aid layer.

DESCRIPTION OF THE PREFERRED EMBODIMENTS

In FIG. 1 the reference numeral 10 designates generally suitable apparatus for the filter system of this invention including apparatus for the recovery of heat values of the filtered solids material. The apparatus 10 includes a tank 11 receiving the filter aid at 12 and also receiving water from a supply pipe 13. A mixing device 14 forms a slurry of the filter aid at 12 and water from the pipe 13, and this slurry is allowed to overflow through a pipe 15 into the filter pan 16 of a rotary drum filter apparatus 17. The apparatus 17 includes a screen cloth covered drum 18 partially immersed in the pan 16 and evacuated as illustrated at 19 to build up a coating 20 of the filter aid 12 with the water of the filter aid slurry being screened through the screen drum 18. The drum rotates in the pan 16 until a coating 20 of the desired thickness has built up on the screen 18, whereupon a valve 21 in the water line feed to the tank 11 is closed and flow of the filter aid slurry into the pan 16 ceases. Then the slurry 22 to be filtered is fed through a feed line 23 into the pan 16 to maintain a pond in the pan. The liquid constituent of the slurry 22 is sucked through the coating 20 and screen 18 of the drum and is removed at 19, while a layer of solids 24 of the slurry builds up on the filter bed coating 20. A scraper 25 removes the layer of slurry solids 24 and a film of the underlying filter aid bed 20, which is sufficiently thick to present a clean surface of the filter bed to the pan 16. The scraper 25 is automatically advanced to remove the sludge solids and a thin film of the underlying filter aid. An auger 26 delivers the scraped off material to a loader 27 which feeds an incinerator 28 having an ignition chamber 29 and a combustion chamber 30. If desired, other industrial wastes may be fed to the loader 27 from a supply line 31.

The hot gases from the combustion chamber are fed through a flue 32 to a boiler 33 receiving water at 34, discharging spent flue gases at 35 and steam at 36. The steam is used as desired to drive a turbine, to supply heat to an industrial process, or the like.

From the above description, it will, therefore, be understood that the filter aid 12 and the solids from the slurry 22 are incinerated at the filter station to recover the heat value thereof and to eliminate disposal problems, since the only discharge will be the gases eliminated at 35 and a small amount of ash discharged from the ignition chamber at 37.

As shown in FIG. 2, the rotary drum filter apparatus 17 has the pan 16 filled to a desired depth with the slurry 22 and the screen cloth covered rotating filter drum 18 with its bed or layer 20 of filter aid material thereon rotates through the pond of slurry 22 to form a layer 24 of the filtered slurry solids thereon while the scraper 25 removes this layer 24 and a thin film 38 of the filter bed 20. As best shown in FIG. 3, the thin film 38 is penetrated with the sludge solids of the overlying layer 24 and this contaminated portion of the filter bed is thus removed to present a fresh clean surface 39 of filter aid material as it reenters the pond 22 in the pan 16.

In accordance with this invention, the pre-coat or filter bed 20 is composed of rigid particles 40 of combustible non-fibrous material such as:
wood charcoal,
bituminous coke,
anthracite coke,
petroleum coke,
char (low temperature coke),
ground nut shells, particularly walnut and pecan shells The combustible non-fibrous material consists of granular particles of sufficient size and shape to provide a bed 20 of desired porosity and having a coefficient of adhesion sufficient to maintain the bed 20 on the filter cloth drum 18 under the filtering vacuum applied to the filter apparatus. In addition, the particles have a coefficient of cohesion to retain the layer of slurry solids 24 on the scraped off film 38 of the filter bed 20. The particles are sufficiently rigid so as to maintain a dimensionally intact layer 20 which will not compress or collapse under the vacuum and slurry solids loads imparted thereon during the filtering step.

Pilot plant runs comparing the efficiency of the filter aids of this invention with standard diatomaceous earth and fibrous cellulose type filter aids were performed on filter drum apparatus of the type illustrated on the drawings and described hereinabove. The apparatus had a one-foot diameter drum with a one-foot longitudinal filter face, 35% of the periphery of the drum being immersed in the slurry in the filter pan 16. The drum was rotated at a speed of three revolutions per minute under a vacuum of 25 inches of mercury. Fourteen pounds of wood charcoal filter aid was slurried in a ten-gallon tank. Water was added to the tank, overflowing the filter aid into the pan 16. The flow rate was regulated to maintain the 35% submerge of the filter drum. A total volume of 30 gallons of water was used to transfer about 95% of the filter aid to the pan 16. A filter bed of about 1¾ inches in thickness was built up on the filter face of the drum.

A slimy gelatinous sludge of a type requiring pre-coat vacuum filtering, and frequently encountered in industrial wastes was used. The particular slurry had a concentration of 1.2% by weight of precipitated ferric hydroxide in water. This slurry or sludge was fed to the pan 16 to maintain the 35% submergence of the filter drum in the slurry.

In a first test, the pre-coat bed was composed of wood charcoal having the following screen analysis:
30% between 125 and 74 microns
35% between 74 and 53 microns
20% between 53 and 44 microns
15% between 44 and 30 microns This wood charcoal pre-coat bed had the following physical properties:

| Compressibility | 0.00067 inches per inch/ per inch of Hg |
|---|---|
| Cohesion | 1.29 |
| Density | 30.4 lbs./ft$^3$ |
| Adhesion | 155 sec. |

Compressibility was measured in terms of the percent change in thickness or depth of the pre-coat bed or cake caused by increasing the applied vacuum from 10 to 25 inches of mercury.

The cohesion coefficient was determined by reducing the vacuum applied to the filter until a vacuum level was reached where the pre-coat bed began to physically deteriorate. The coefficient is the ratio of the weight of the cake on the filter drum in pounds per square foot to the vacuum required to prevent deterioration of the pre-coat bed in pounds per square inch.

The density factor as indicated was measured in terms of pounds per cubic foot of the filter bed.

The adhesion coefficient was determined by the time in seconds required for the pre-coat bed or cake to fall off of the drum when the vacuum was turned off. The time was measured in seconds that the cake remains intact on the drum.

The knife 25 was advanced to remove the filtered out ferric hydroxide and the penetrated layer of the pre-coat cake or filter aid bed 20 as described hereinabove. The penetrated area of the charcoal pre-coat cake was found to be much less than the penetrated area obtained with conventional diatomaceous earth type filter aids.

A flow rate of 32.7 gallons per hour per square foot of filter bed was obtained, resulting in a filtering efficiency of 43.8 gallons per pound of filter aid.

Under the same testing conditions, a diatomaceous earth filter aid bed performed as follows:

| Flow Rate | 33.3 gal./hr./ft$^2$ |
|---|---|
| Compressibility | 0.000612 inches per inch/ per inch of Hg |
| Cohesion | 0.77 |
| Cake density | 21.72 lbs./ft$^3$ |
| Adhesion | 15 |
| Efficiency | 32.35 gal./lb. |

It will thus be noted that the wood charcoal filter aid is equal in performance to the diatomaceous earth filter aid in flow rate and compressibility and is superior in performance in cohesion, adhesion and efficiency.

Under the same testing conditions, a cellulose filter aid (Eagle Pitcher Pre-Co-Floc Filter Aid PB-100M) gave the following results:

| | |
|---|---|
| Flow Rate | 14.33 gal/hr./ft² |
| Compressibility | 0.001714 inches per inch/ per inch of Hg |
| Cohesion | 0.355 |
| Cake density | 20.05 lb./ft³ |
| Adhesion | 12 |
| Efficiency | 14.68 gal./lb. |

It will thus be noted that the wood charcoal filter aid was superior in all respects to the cellulose filter aid.

The following ranges of particle size distribution of wood charcoal were found to be suitable as filter aids:

FINE GRADE

0% between 125 and 74 microns
15% between 74 and 53 microns
35% between 53 and 44 microns
40% between 44 and 30 microns
10% below 30 microns

COARSE GRADE

40% between 125 and 74 microns
45% between 74 and 53 microns
15% between 53 and 44 microns
0% below 44 microns The particle size distribution will determine the flow rate and efficiency of the filter aid for a particular filtering operation and this invention provides particle size distributions to maintain maximum efficiencies for filtering sludges of different characteristics.

The particle size analyses were made with a standard dry (Tyler) screen analysis apparatus.

In general, preferred particles have a dry bulk density of from about 0.3 to about 0.6 grams per cubic centimeter, a particle density of about 1.4 to 1.7 grams per cubic centimeter, and particle sizes of from about 30 to 125 microns.

The individual particles are irregular in shape to provide a porous bed and to interlock for forming structural stability to maintain a bed 20 of desired thickness. The combustible material is inert to the slurries being filtered. Typical slurries with combustible solids which are usefully treated with the filter aids of this invention include the following waste streams:

food processing,
bakeries,
meat processing,
poultry processing,
pulp and paper mills,
sludges from biological waste treatment plants,
oil recovery systems,
petrochemical process streams.

The sludges treated according to this invention need not have completely combustible solids ingredients, since the invention is useful in those systems where incombustible solids are to be recovered in a form suitable for reprocessing or reuse. In such systems, the heretofore required non-combustibl filter aids prevented the recovery of useful non-combustible solids.

It has been found that wood charcoal is preferred for the pre-coat bed on the vacuum drum although it is not commercially available in the micron size range needed to form an effective bed. However, it can be commuted and screened to the needed size range with clean cut, well defined discrete grains or particles. Nut shells, such as walnut shells, on the other hand, tend to form stringy particles which lump together and can cause a problem in forming a uniform pre-coat bed and again during the scraping off of the thin film under the deposited filtered out solids. Also nut shells can contain a soluble coloring agent which discolors the filtrate.

From the above description, it will therefore be understood that this invention provides rotary vacuum pre-coat filter units and filtering systems with combustible non-fiber filter aids of controlled densities and particle sizes minimizing disposal problems encountered with heretofore known pre-coat filter systems and also providing for recovery of heat values from the filter aid and filtered solids.

It will be apparent to those skilled in the art that many modifications and variations may be effected without departing from the spirit and scope of the novel concepts of the present invention.

I claim:

1. In a pre-coat rotary vacuum filter system including an evacuated rotary filter drum, the improvement of a filter aid pre-coat on the periphery of the drum composed of rigid, granular, non-fibrous combustible material having a particle size of from 30–125 microns.

2. The filter system of claim 1 wherein the non-fibrous combustible material is wood charcoal 3. The filter system of claim 1 wherein the non-fibrous combustible material has a bulk density of 0.3 to 0.6 grams per cubic centimeter, and a particle density of from about 1.4 to 1.5 grams per cubic centimeter.

4. The filter system of claim 1 wherein the combustible material is wood charcoal and the initial precoat is about 2 to 6 inches thick.

5. The filter system of claim 1 wherein the non-fibrous material has a dry bulk density of about 0.3 to 0.6 grams per cubic centimeter and a particle density of about 1.4 to 1.5 grams per cubic centimeter.

6. A vacuum pre-coat filter unit including an evacuated filter drum with a screen periphery, a tank for liquid material to be filtered receiving a portion of the periphery of the drum in the liquid, a filter aid bed on the periphery of the drum composed of rigid granular wood charcoal having a dry bulk density of 0.3 to 0.6 grams per cubic centimeter, a particle density of from about 1.4 to 1.5 grams per cubic centimeter, and a particle size of about 30 to 125 microns, and a scraper cooperating with the periphery of the drum to remove filtered out solids and a thin film of the wood charcoal underlying the solids.

7. The filter system of claim 6 including an incinerator receiving the scraped off filtered out solids and the filter aid material for burning the combustible ingredients therof.

8. The filter system of claim 7 including means for recovering heat from said incinerator.

9. The filter system of claim 6 wherein the initial filter aid coating is about 2 to 6 inches thick and the thin underlying film is less than about ¼ inch thick.

* * * * *